United States Patent Office 3,049,006
Patented Aug. 14, 1962

3,049,006
METHOD OF ANALYSING CEREALS AND OTHER STARCH-CONTAINING SUBSTANCES AND PRODUCTS THEREOF
Carl Sven Oscar Hagberg, Bergbacken 2, Saltsjo-Duvnas, Sweden
No Drawing. Filed Sept. 29, 1958, Ser. No. 763,802
11 Claims. (Cl. 73—169)

This invention relates to a method of analysing cereals and other starch-containing substances and products thereof.

The malting degree or so-called diastatic state or condition of cereals is of great importance for the quality of products prepared from them, such as flour, bread and other pastry, etc. In different stages of the production process, such as receiving and treatment of raw materials and also in the manufacture it is therefore important to have at one's disposal rapid and reliable methods of estimating the diastatic condition. If cereals or products thereof, for example flour, have too high a diastatic state or condition these commodities, or bread made from them, cannot in serious cases be used for human consumption owing to the fact that the bread will be inclined to crust or be overbaked or will have a doughy streak or the inside will be all "doughy" or "underbaked."

The reason for this is that flour from sprouted grain is so rich in enzymes that too large a part of the flour substance, mainly starch, is decomposed by fermentation into sugar and dextrines which do not possess the gelatinization property of the starch. The quantity of substance which is decomposed into soluble constituents depends, among other things, on the quantity and efficacy of the enzymes and the varying capacity of the substances to resist enzymes. The nature of the milieu, that is to say the occurrence of salts, buffering substances, acids and/or yeast etc., also has an effect. Thus the enzymes decompose starch more easily than protein substances, whereas gelatinized starch is more easily decomposed than non-gelatinized starch.

In order to determine the diastatic condition or state of cereals and products thereof it has been suggested to determine the soluble constituents former by autolysis.

The diastatic state of cereals and products thereof can also be determined by determining the viscosity or consistency in an aqueous suspension of a certain flour concentration which has been subjected to autolysis and pasting for a certain time. Such methods, however, usually require expensive apparatus and a good deal of time for the analysis. Viscosimetric methods have, in addition, the disadvantage that they do not always give correct results, among others when there is a question of judging the suitability of a cereal product for baking, as the bread preferably has plastic and not viscous properties.

To avoid some of the disadvantages now indicated, for example an expensive apparatus, one can measure the autolyses time required at a certain temperature, for example 60° C., to decompose enzymatically soluble starch, for example, to such an extent that it is not coloured by iodine, that is to say when the starch has been decomposed into sugar and low-molecular dextrines which are not coloured by iodine. This method is, however, very complicated and takes much time, the autolyses alone requiring for example, one or more hours in the case of a flour of a normal diastatic condition or state. Such methods are also often misleading, for example when it is desired to ascertain the suitability of a cereal product for baking. The reason is, among other things, that the starch in the bread has by no means been broken down to such an extent that it is not coloured by iodine.

The main object of the present invention is to determine the enzymotic effect in starch-containing substances by a method which avoids expensive apparatus and a waste of time, and is adequate also for estimating the suitability of the cereal products and the enzymotic preparation for bread-baking.

A further object of the invention is to determine in as simple a manner as possible under which conditions a flour-water suspension, which has been heated above the gelatinization temperature of the starch, just passes over from being a gelatinized mass with a solid (preferably plastic) consistency into a liquid form, that is to say containing, preferably, soluble constituents. The gelatinization temperature usually is at 58° C. in rye products, and usually at 62° in wheat products, but it can also be somewhat lower or higher. In other cereals, such as oats, barley, maize, rice and potatoes, this temperature is similar or somewhat higher.

According to the invention one determines either the time which a rapidly heated suspension having a definite concentration requires to be transformed from a gelatinized into a viscous condition, or else the gelatinized condition is observed by means of a series of suspension tests having different concentration and heated up in a like manner and for an equal length of time.

As an example of carrying out the invention I may mention that 3 g. of flour, for example, are put in a bucket or in a narrow test-tube having a diameter of 17–18 mm., containing 15 ml. of water at 20° C. The test-tube is shaken and then placed in a water bath of 80° C., or some other temperature above the gelatinization temperature of the starch. After about 1½ min. the gelatinization temperature of 58 and 62° C., respectively, for rye and wheat respectively is reached, and after a further 1½ min. the temperature in the tube is about 75–77°. When the gelatinization temperature has been passed the suspension in the tube rapidly becomes transformed into a thick, plastic, glutinous or gelatinous pulp. The tube is then allowed to remain in the bath long enough for the plastic pulp to be barely or just transformed into a viscous, fluid liquid. The time required for this is then noted and is a satisfactory measurement of the diastatic condition of the flour. In such tests a strongly malted rye flour has, for example, been found to pass over into a liquid form after approximately 2 min. or less from the beginning of the autolysis, whereas the corresponding time for a normally malted rye flour amounts to about 4 min. from the start. The actual determination thus only takes approximately 2–4 min., and, including weighing, approximately 3–5 min. The invention thus constitutes a rapid method which is far superior to other adequate methods. The cost of the apparatus for test proper to determine when the pulp passes over from a firm into a fluid or liquid form is insignificant, as by tilting the bucket or test-tube one can observe or estimate with a glass rod or the like, when the gelatinized mass is transformed from one state or condition into the other. Such a low concentration of flour as 3 g. of flour to 15 ml. of water can only be employed if the rise in temperature of the suspension is rapid (in the present instance 20°–30° C. per minute) which is possible because a narrow test-tube is used. When slower heating is adopted (for example with wider test-tube or vessel) the flour concentration must be considerably higher so that the gelatinized mass must first be plastic and not immediately viscous. In the latter instance measurement of the time for the transformation phase is rendered impossible.

According to another embodiment of the invention the heating time and rise in temperature are allowed to be constant, while the flour concentration varies. In one example, 30 ml. of water of 20° C. are poured into each one of different test-tubes having a diameter of about 20 mm. and a length of about 200 mm., adding varying quantities of flour to the different tubes, for example 3, 4½, 6, 7½, 9, 10½, 12 g. and so on. The test-tubes are shaken and then inserted in a bath of boiling water or heated in some other manner above the gelatinization temperature of the starch. When the test-tubes have remained in the bath for 3 min., for example, (they can also be heated for a longer time), and the temperature in the tubes has risen to 80–85° C., the enzymotic decomposition and the gelatinization is essentially terminated, and observations can be made, for example by tilting the tube or estimating by means of a glass rod or such like, if the suspension or pulp in the various tubes is thick or fluid. The flour concentration in percentage of the quantity of water in the tube which does not contain fluid suspension, and which is closest to a tube with fluid suspension or pulp represents a measure of the diastatic condition of the flour. It is often merely a matter of determining the maximum diastatic condition permitted in, for example, cereals or a product hereof. To do this all that is needed is a test-tube for every product, so that the method will be most simple and rapid. Values obtained according to this method are, for example 40% for a malted wheat flour and 20% for an unmalted wheat flour. The phase transformation can be estimated either with a hot sample or test, or by means of samples which have been cooled, for example to room temperature. In the latter instance the effect of the retrogradation is apparent. Cooling may be desirable if, for example, the temperature of the water bath is so low, for example 65 or 70° C., that the enzymotic activity has not been rendered inactive.

According to another process a conical bucket or vessel is heated up, for example by emerging it into a water bath. The vessel contains a flour suspension with a suitable flour concentration which is heated for an appropriate time to a temperature exceeding the gelatinization temperature of the starch. It is thereafter observed, or determined, how great a portion of the pulp or suspension is transformed from a plastic or solid condition into a viscous or fluid condition, possibly after cooling of the heated pulp or suspension. The determination of the fluid portion of the pulp can be effected, for example by tilting the conical vessel and is then possible to determine how much of the contents of the vessel that have run out. The solid fluid portion, respectively, of the contents of the vessel can also be determined with a feeler, such as a glass rod.

The fact that a portion of the pulp or suspension in the vessel (the lower part) will be solid and another portion (the upper, inner one) fluid is due to the heat needing longer time to penetrate into the pulp if the diameter of the vessel is large, as is the case in the upper, inner part of the conical vessel. The autolysis period during which the enzymes are active before they are weakened or inactivated by the heat is longer in the upper, inner part of the conical bucket. Similar results are obtained if the flour suspension is heated under otherwise similar conditions in a number of test-tubes or vessels having varying diameters, and thereafter, possibly after cooling, it is determined which tube contains pulp or suspension in a solid and fluid state, respectively.

The methods now presented are merely examples.

It is often to advantage also to investigate the effect of salts, buffering substances, acids, alkalies and/or yeast, fat, etc.

The enzyme activity in an enzyme preparation can also be examined in such a way that a starch-containing product or pure starch is mixed with a certain quantity of the enzyme preparation the activity of which is to be determined, if desired by adding salts, buffering substances and/or yeast, etc.

As a further suitable example of carrying the invention into effect I may mention that testing tubes may be submerged into a boiling water bath, said tubes having an inner diameter of, say 20 mm. and a length of about 220 mm. The tubes contain a mixture of 5 g. flour and 25 ml. water. By means of a suitable agitator, for instance consisting of crossing arms or a wheel with spokes or the like fixed to a rod or shaft extending at right angles to the plane of said wheel or arms the contents of the testing tube may be agitated periodically or continuously during the heating of the tube in the boiling water (about 100° C.). The agitator is reciprocated in the longitudinal direction of the tube during the agitation and is guided in a boring in a plug in said tube.

The relatively high temperature of the bath and the agitation causes that the gelatinized mass will be transferred from solid to liquid state very rapidly, say in a time of about 1 minute. This time may be ascertained easily and relatively exactly by allowing the agitator to sink rapidly (for instance in a time of 1 to 2 or 3 seconds) under the action of its own gravity.

In this example the necessary time for transforming the gelatinized mass from solid into liquid state may be so short as about 40 seconds for flour with very high malting degree, and about 60 seconds for flour having a rather high malting degree, and about 90 to 180 seconds for flour having normal malting degree (which is somewhat different for flour intended for different purposes). Generally the test may be terminated in 3 or 4 minutes when cereals or flour for baking purposes are tested but with testing material poor in enzymes the test may be continued for some further minutes.

What I claim is:

1. In a method of determining the suitability of a starch-containing substance for baking, the steps of heating a suspension of a finely divided starch-containing substance in water to a temperature sufficiently high to cause gelatinization of said starch-containing substance in said water, thereby converting said suspension into a gelatinous mass; and maintaining said gelatinous mass at a temperature above the gelatinization temperature of said starch-containing substance until said gelatinous mass becomes transformed into a viscous liquid, the relationship between the concentration of said starch-containing substance and the time required for the transformation from gelatinized condition into a viscous liquid being an indication of the diastatic condition of said starch-containing substance which in turn is an indication of the suitability of said starch-containing substance for baking.

2. In a method of determining the suitability of a starch-containing substance for baking, the steps of heating a suspension of predetermined concentration of a finely divided starch-containing substance in water to a temperature sufficiently high to cause gelatinization of said starch-containing substance in said water, thereby converting said suspension into a gelatinous mass; and maintaining said gelatinous mass at a temperature above the gelatinization temperature of said starch-containing substance until said gelatinous mass becomes transformed into a viscous liquid, the time required for the transformation of said predetermined concentration of said starch-containing substance from gelatinized condition into a viscous liquid being an indication of the diastatic condition of said starch-containing substance which in turn is an indication of the suitability of said starch-containing substance for baking.

3. In a method of determining the suitability of a starch-containing substance for baking, the steps of heating a suspension of predetermined concentration of a finely divided starch-containing substance in water to a temperature above 70° C. and sufficiently high to cause gelatinization of said starch-containing substance in said water, thereby converting said suspension into a gelatinous mass; and maintaining said gelatinous mass at said temperature above the gelatinization temperature of said starch-containing substance until said gelatinous mass becomes transformed into a viscous liquid, the relationship between the concentration of said starch-containing substance and the time required for the transformation from gelatinized condition into a viscous liquid being an indication of the diastatic condition of said starch-containing substance which in turn is an indication of the suitability of said starch-containing substance for baking.

4. In a method of determining the suitability of a starch-containing substance for baking, the steps of heating a suspension of predetermined concentration of a finely divided starch-containing substance in water containing at least one substance selected from the group consisting of salts, buffers, acids and enzyme-inactivating substances to a temperature sufficiently high to cause gelatinization of said starch-containing substance in said water, thereby converting said suspension into a gelatinous mass; and maintaining said gelatinous mass at a temperature above the gelatinization temperature of said starch-containing substance until said gelatinous mass becomes transformed into a viscous liquid, the relationship between the concentration of said starch-containing substance and the time required for the transformation from gelatinized condition into a viscous liquid being an indication of the diastatic condition of said starch-containing substance which in turn is an indication of the suitability of said starch-containing substance for baking.

5. In a method of determining the suitability of a starch-containing substance for baking, the steps of adding to a suspension of predetermined concentration of a finely divided starch-containing substance in water an enzyme-containing substance; heating said suspension to a temperature sufficiently high to cause gelatinization of said starch-containing substance in said water, thereby converting said suspension into a gelatinous mass; and maintaining said gelatinous mass at a temperature above the gelatinization temperature of said starch-containing substance until said gelatinous mass becomes transformed into a viscous liquid, the relationship between the concentration of said starch-containing substance and the time required for the transformation from gelatinized condition into a viscous liquid being an indication of the diastatic condition of said starch-containing substance which in turn is an indication of the suitability of said starch-containing substance for baking.

6. In a method of determining the suitability of a starch-containing substance for baking, the steps of heating a series of suspensions of different concentration of a finely divided starch-containing substance in water to a temperature sufficiently high to cause gelatinization of said starch-containing substance in said water, thereby converting said suspensions of different concentration into gelatinous masses; and maintaining said gelatinous masses of different concentrations at said temperature for a predetermined time sufficient to transform one of said galatinized masses into a viscous liquid, the relationship between the concentration of said transformed gelatinized masses and said predetermined time being an indication of the diastatic condition of said starch-containing substance which in turn is an indication of the suitability of said starch-containing substance for baking.

7. A method of determining the diastatic condition of cereals and other starch-containing substances, and products thereof, comprising the steps of heating a thick suspension of predetermined concentration of a disintegrated starch-containing substance in water above the gelatinizing temperature of the starch and measuring the time, which a rapidly heated fluid suspension of this kind having a definite concentration, requires to be transformed from a gelatinized into a viscous condition, and determining the diastatic condition of said substance on the basis of said measured time.

8. A method of determining the diastatic condition of cereals and other starch-containing substances, and products thereof, comprising the steps of heating a thick suspension of predetermined concentration of a disintegrated starch-containing substance in water above the gelatinizing temperature of the starch, and observing the gelatinizing condition by the aid of a series of suspension samples having different concentration, and which have been heated in like manner and for an equal time, and computing from said gelatinizing condition the diastatic condition of said substance.

9. A method of determining the diastatic condition of cereals and other starch-containing substances and products thereof, comprising the steps of heating a suspension of predetermined concentration of a disintegrated starch-containing substance to a temperature exceeding the gelatinizing temperature of starch in a vessel and determining that portion of the substance, which has been transformed from a plastic into a viscous condition, in relation to the total quantity of the suspension, and computing from that relation the diastatic condition of said substance.

10. A method as claimed in claim 9, in which the portion of the suspension which has been transformed from a plastic into a viscous condition is determined by tilting the vessel and measuring the quantity which runs out.

11. A method as claimed in claim 9, in which the portion of the suspension which has been transformed from a plastic into a viscous condition is determined by means of a feeling body placed in contact with the contents of the vessel.

References Cited in the file of this patent

UNITED STATES PATENTS

| | | |
|---|---|---|
| 2,129,043 | Bortsch | Sept. 6, 1938 |
| 2,423,687 | Davis et al. | July 8, 1947 |
| 2,731,828 | Parrette et al. | Jan. 24, 1956 |
| 2,878,715 | Rhees | Mar. 24, 1959 |

FOREIGN PATENTS

| | | |
|---|---|---|
| 130,146 | Sweden | Nov. 21, 1950 |
| 1,117,928 | France | Mar. 5, 1956 |